US006221798B1

(12) United States Patent
Mahale et al.

(10) Patent No.: US 6,221,798 B1
(45) Date of Patent: Apr. 24, 2001

(54) METHOD FOR PRODUCING LAMINATED WEBS

(75) Inventors: Anant D. Mahale, Chester; Xiang Yu, New York; George Karles, Monroe, all of NY (US); Narendra Srivatsa, Ramsey, NJ (US)

(73) Assignee: International Paper Company, Purchase, NY (US)

( * ) Notice: Subject to any disclaimer, the term of this patent is extended or adjusted under 35 U.S.C. 154(b) by 0 days.

(21) Appl. No.: 08/899,837

(22) Filed: Jul. 24, 1997

(51) Int. Cl.$^7$ .................................................. B32B 21/10
(52) U.S. Cl. .................... 442/295; 442/401; 442/412; 428/537.5; 156/176; 156/308.8
(58) Field of Search ................. 156/176, 308.8; 442/295, 401, 412; 428/537.5

(56) References Cited

U.S. PATENT DOCUMENTS

| 471,611 | 3/1892 | Hochman . | |
|---|---|---|---|
| 1,829,157 | 10/1931 | Richter . | |
| 2,007,551 | 7/1935 | Tompkins | 92/38 |
| 2,017,339 | 10/1935 | Bryant et al. | 92/40 |
| 2,800,162 | 7/1957 | Rohdin | 154/42 |
| 3,156,608 | 11/1964 | Kamins et al. | 161/269 |
| 3,560,297 | 2/1971 | Black et al. | 156/306 |
| 3,775,217 | 11/1973 | Blake et al. | 156/308 |
| 3,837,995 | 9/1974 | Floden | 161/150 |
| 3,954,554 | 5/1976 | Curry | 162/104 |
| 4,506,457 | 3/1985 | Lehtinen | 34/41 |
| 4,787,641 | 11/1988 | Rautakorpi et al. | 277/135 |
| 4,899,461 | 2/1990 | Lehtinen | 34/13 |
| 4,932,139 | 6/1990 | Lehtinen | 34/41 |
| 5,213,819 | 5/1993 | Bielfeldt | 425/371 |
| 5,352,321 | 10/1994 | Held | 156/498 |
| 5,395,576 | 3/1995 | Blauhut et al. | 264/166 |
| 5,471,765 | 12/1995 | Rautakorpi et al. | 34/242 |
| 5,484,500 | 1/1996 | Kaufmann | 156/198 |
| 5,524,532 | 6/1996 | Koivukunnas et al. | 100/38 |
| 5,594,997 | 1/1997 | Lehtinen | 34/95 |

OTHER PUBLICATIONS

Tampella Papertech; "The Basic Condebelt Process Can be Modified to Satisfy a Variety of Special Quality Demands"; Jukka Lehtinen, *World Pulp & Paper Technology* 1993 1992, pp. 105–110.

*Primary Examiner*—Christopher Raimund
(74) *Attorney, Agent, or Firm*—Luedeka, Neely & Graham, P.C.

(57) ABSTRACT

The specification discloses a method for laminating a synthetic film or sheet to a fibrous web. According to the method, a heat-softenable material is combined as a sheet, film, spray or powder with a continuous fibrous web in interfacial contact with fibers of the fibrous web to form a composite. The composite is then continuously conducted through an extended nip dryer where heat and pressure are applied to the composite to effect a substantial reduction in moisture content of the composite while plasticizing the heat-softenable material so that at least a mechanical bond is formed between the material and the fibers of the web characterized by an intermingling of the fibers and the heat-softenable material.

51 Claims, 3 Drawing Sheets

METHOD FOR PRODUCING LAMINATED WEBS

FIELD OF THE INVENTION

The present invention relates to methods for making multi-layer composites containing layers of fibrous materials laminated with synthetic films and the like.

BACKGROUND OF THE INVENTION

Laminated webs may be made from a variety of materials for a variety of applications. When one of the layers of laminate is a fibrous web to which a synthetic sheet or film is to be attached, conventional practice is to first prepare the fibrous web and then apply the synthetic sheet or film to the web. Accordingly, the layers of the laminate are made separately and then combined in a separate lamination step.

The use of separate forming and lamination steps for laminating synthetic sheets or films to fibrous webs requires separate equipment to store and handle each component. These separate steps add to the cost and complexity of the process.

Accordingly, it is an object of the invention to provide a method for making a laminate comprising a synthetic sheet or film and a fibrous web.

Another object of the invention is to provide a lamination method of the character described which is carried out during formation of the web.

A further object of the invention is to reduce the number of process steps and the time required to form a laminated fibrous web.

An additional object of the invention is to provide a lamination method of the character described which enables simplified, high speed production of laminated fibrous webs.

Still another object of the invention is to provide a laminating method of the character described which is versatile and enables production of laminates with a desirable range of aesthetic and functional characteristics.

SUMMARY OF THE INVENTION

With regard to the above and other objects, the invention provides a method for laminating a synthetic film or sheet to a fibrous web. The method comprises continuously depositing an aqueous slurry of fibers on a moving foraminous support equipped to drain water from the slurry leaving fibers deposited thereon as a continuous fibrous web and pressing the web to consolidate the fibers to provide a pressed web having a moisture content of at least about 40% by weight. A continuous layer containing a heat-softenable polymeric material is combined with the pressed web in interfacial contact with fibers of the web to provide an at least two-layer continuous composite having opposed outer surfaces. The composite is continuously conducted through an extended nip dryer and pressure is applied substantially simultaneously to the opposed outer surfaces of the composite in the dryer while applying heat to at least one of the surfaces to cause evaporation of water from the fibrous web, reducing the moisture content of the web to below about 40% by weight water and plasticizing the heat-softenable polymeric material so that at least a mechanical bond is achieved between the layer and the fibrous web characterized by an intermingling of fibers in the fibrous web with the polymeric material in the layer.

According to another aspect of the invention, an on-line lamination process is provided for fibrous webs. The process comprises continuously conducting a continuous fibrous web having a moisture content ranging from about 40 to about 70% by weight water and a continuous layer comprising a heat-softenable polymeric material in interfacial contact therewith through an extended nip dryer to provide a continuous at least two-layer composite having opposed outer surfaces. In the dryer, pressure is applied substantially simultaneously to the opposed outer surfaces of the composite and heat is applied to at least one of the surfaces of the composite to cause evaporation of water therefrom substantially reducing the water content of the web. The heat applied to the composite together with steam generated by water vaporized from the web causes the polymeric material to soften so that fibers from the web intermingle with the material forming a bond therebetween. In one embodiment, water is applied to the web before it passes through the dryer to provide the necessary moisture content for steam generation in the dryer.

An additional aspect of the invention involves a process for making a three or more layer composite by an on-line lamination process. In the process, an elongate bonding layer containing a heat-softenable material provided as a powder, spray, film or sheet is continuously combined with an elongate first fibrous web. An elongate second fibrous web is combined in interfacial contact with the bonding layer to provide an at least three-layer composite with the bonding layer sandwiched between the first and second fibrous webs. Heat and pressure are applied to the composite in an extended nip dryer unit sufficient to cause the fibers of the first and second webs to become intermingled with the bonding layer in order to bond the first and second webs together. The first and second fibrous webs may comprise natural or synthetic fibers and at least one of the first or second webs has a moisture content from about 40% by weight to about 70% by weight. The other web preferably have a moisture content no higher than about 80% by weight. The bond layer disposed between the webs may comprise a fibrous web containing a heat-softenable material in particulate or powder form or a sheet or film comprised of a heat-softenable material. Additional layers and webs may be applied to the three layer composite to produce multi-layer composite webs.

Conventionally, laminated webs comprised of different materials are produced by combining pre-formed sheets or webs and then bonding the materials together in a separate step using heat, pressure and/or an adhesive with conventional laminating equipment such as press-rolls and the like. The process of the invention departs from such prior practices in the case of fibrous web components of such laminates by using a wetted web in an extended nip dryer enabling the composites to be produced on-line while the fibrous web is being made thereby achieving an efficient and economical mode of production and an improved product with a more tenacious and uniform bond between the layers. The process therefore provides a significant advance in the art of laminating materials to fibrous webs and provides substantial savings in terms of equipment costs and process time.

BRIEF DESCRIPTION OF THE DRAWINGS

The above and other features and advantages of the invention will now be further described in the following detailed description of preferred embodiments of the invention considered in conjunction with the drawings in which.

DETAILED DESCRIPTION OF THE INVENTION

An important feature of the invention is the use of an extended nip dryer, preferably a condebelt dryer, to dry, press and essentially simultaneously bond a layer containing a polymeric material to a fibrous web. According to a preferred embodiment of the invention, a fibrous web undergoing formation from an aqueous slurry is conducted, preferably after pressing the web to consolidate the fibers, at a relatively high moisture content in interfacial contact with a layer containing a heat-softenable polymeric material through the extended nip dryer where heat and pressure are applied to the superposed layers to complete drying and formation of the fibrous web and to simultaneously plasticize or soften the polymeric material to a degree sufficient to enable a substantial number of fibers from the forming web to become intermingled with the layer containing the polymeric material.

Figure 1:
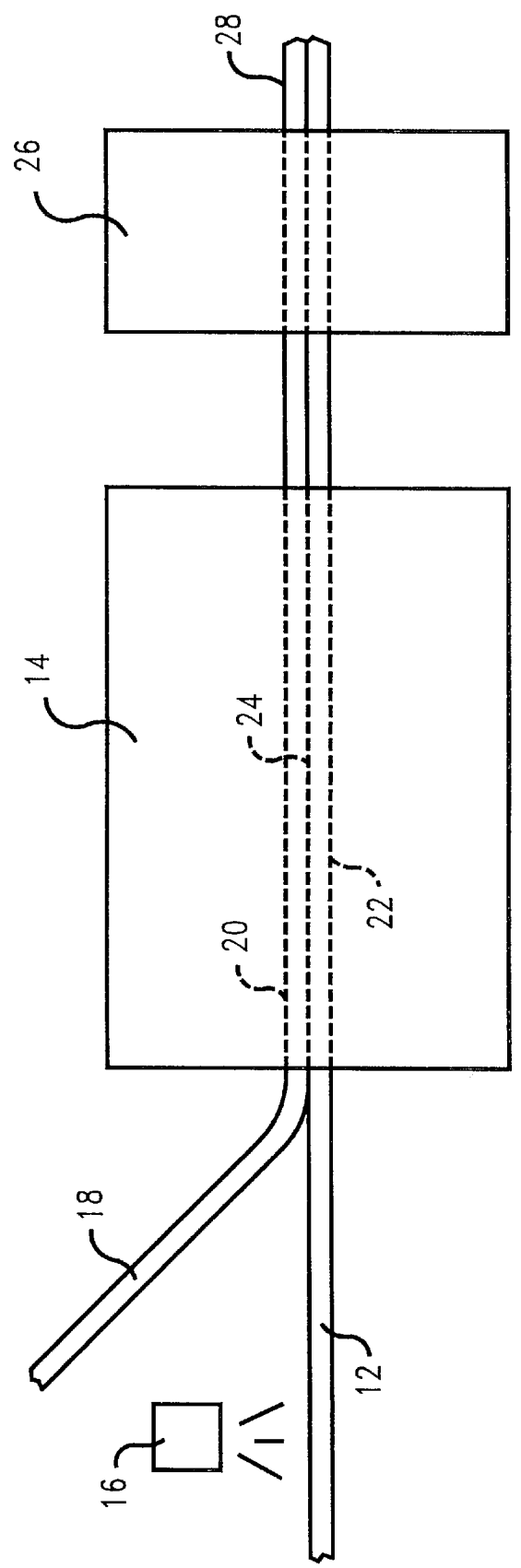
FIG. 1 is a schematic representation of a lamination process conducted according to the invention.

With reference to FIG. 1, a system 10 according to the invention for laminating a sheet or film comprising a heat-softenable material to a continuous fibrous web is illustrated. In the method, a continuous fibrous web 12 enters an extended nip dryer unit 14 from a web production stage (not shown) which may be any web forming technique used in making paper, paperboard (single or multi-ply), nonwovens or spunbond sheets. In an especially useful embodiment, web 12 is in an intermediate stage of formation (a "forming web" as used herein) having been consolidated to a significant degree by passage through the wet press section of a papermaking machine. As is well known to those of ordinary skill, the web forms on the wire from an aqueous slurry deposited thereon from a headbox. Consolidation or "formation" of the web 12 on the wire occurs as water is removed from the fibers to obtain a web having a consistency ranging from about 30 to about 60% by weight solids, depending on the grade of paper. Paper or paperboard webs which may be used in the methods and compositions of the invention typically have weights ranging from about 33 to about 90 pounds per 1000 square feet.

The web coming off the couch roll at the end of the wire enters a press section where its consistency is increased to in the neighborhood of 40 to about 50% by weight, again depending on the grade of paper, and the resulting pressed web is sufficiently consolidated to enable the drying process to begin. For fibrous webs produced by other methods such as nonwoven and spunbond sheet, moisture may be added to the web by a spray unit 16 to achieve a web moisture content of at least about 40% by weight for the practice of the invention.

A continuous layer 18 such as an elongate sheet or film incorporating a heat-softenable material to be laminated to the fibrous web 12 may be supplied as roll stock or fed to the process from a co-former wherein the sheet or film is produced by various processes such as sheet extrusion and the like. In general, layer 18 may include synthetic films, woven and nonwoven materials, spunbond materials as well as laminated sheets or plies of two or more of the foregoing. The layer 18 may therefore be formed by extrusion of a film of thermoplastic material in a film extrusion process, melt-blowing a film of the material or wet or dry laying natural or synthetic fibers or blends thereof having thermosetting or thermoplastic characteristics. Natural or synthetic fibers may optionally be mixed with or impregnated by a thermoplastic or thermosetting resinous binder on a web or sheet forming machine or any other conventional web or sheet forming or coating process. The heat-softenable material may also be applied to the fibrous web as a powder or spray in the form of a particulate material.

The layer 18 minimally requires an attribute of softenability or plasticizability sufficient under the conditions of temperature and pressure applied during the drying/laminating process to soften and deform into the fiber network of the forming web so that fibers from the web become intermingled with the softened component of the layer which, upon cooling, is firmly locked onto the dried web. In practice, it is preferred that the layer 18 contain as a significant component a thermoplastic or thermosetting material having a softening point in the range of from about 50° to about 200° C., most preferably from about 50° to about 80° C. The polymeric materials used to make layer 18 may therefore include, without limitation, polypropylene, polyethylene, polyvinyl chloride, polystyrene, polyamides, co-polymers of two or more of the foregoing polymers, and any of the foregoing polymers with polyvinyl acetate as well as naturally occurring thermoplastic materials. Thermosetting materials which may be used include epoxides, phenolics, alkyds, amino resins, polyesters, silicones and the like.

Accordingly, a wide variety of materials may be used for layer 18 provided the materials have properties which have a tendency to commingle with the fibers and to form a structurally sound laminate composite with the fibrous web under the processing conditions described herein. In addition to the thermoplastic and thermosetting materials, natural materials which may be incorporated into layer 18 may be selected from the group consisting of, but not limited to, wood, carbon and vegetable fibers, minerals, stabilizers, extenders and pigments. Continuous cellulosic fibrous sheets containing thermoplastic or thermosetting resins or coated with a thermoplastic or thermosetting polymeric or adhesive material, latex or powder may also be used as layer 18.

Layer 18 is preferably continuously combined with the fibrous web 12 in superposed interfacial contact with the fibers of the web to provide an at least two layer composite web 20 containing at least layer 18 and web 12 and opposed outer surfaces 22 and 24 which may or may not be surfaces of layer 18 and web 12 depending on whether, for example, additional layers or webs are present. The invention is not limited to depositing the layer 18 onto the fibrous web 12 and these layers may therefore be combined in various ways. For example, the layer 18 and web 12 may be combined by applying or depositing the layer 18 onto the fibrous web 12 or by applying or depositing the fibrous web 12 onto the layer 18.

The composite 20 is continuously conducted through the extended nip dryer 14, preferably a condebelt dryer, wherein heat and pressure are applied to opposed surfaces 22 and 24 to effect a bond between layer 18 and web 12. Typical configurations for a condebelt dryer unit and its mode of operation are described in U.S. Pat. Nos. 4,506,457, 4,899, 461 and 4,932,139 to Lehtinen incorporated herein by reference as if fully set forth.

In dryer unit 14, heat is applied to at least one of the surfaces 22 or 24 of the composite web 20 using a heat-conducting surface having a temperature ranging from about 120° to about 200° C. Typically, heat will be applied to the surface 24 adjacent layer 18. However, the invention is not limited to applying heat to the surface 24 and heat may also or only be applied to the other surface 22 of composite 20.

Essentially simultaneously with heating the composite 20, pressure is applied to both surfaces 22 and 24 to effect bonding between layer 18 and fibers of web 12. Pressures in the range of from about 28 psig (1.93 bars) to about 150 psig (10.34 bars) are preferred for most applications. Because of the wide range of potential applications of the invention, some adjustment may be necessary to arrive at the optimal time, temperature and pressure relationship for a given composite.

A vacuum condition may also be established in or adjacent dryer unit 14 to promote removal of water from the cellulosic web 12 during the lamination, but it is preferred that the major driving force for evaporation be heat so that steam will be generated for its plasticizing effect on layer 18. Preferably, the water evolved from web 12 in dryer unit 14 reduces the moisture content of web 12 to from about 55% to about 5% by weight water. A subsequent conventional dryer 26 may be used to further dry the composite 20 to a moisture content of web 12 to less than about 1% by weight water, and the composite 20 may thereafter be calendered and/or coated for a range of finishes and surface effects.

The residence time of composite 20 in the extended nip dryer 14 needed to effect bonding is determined in large part by the nature of the material comprising layer 18 and the amount of water which needs to be removed from web 12 to complete formation of web 12. In general, the longer the residence time, the greater the degree of bonding between the materials. However, too high a temperature or too long a residence time could damage the materials and/or cause too much of the layer 18 to flow into the web 12 for many applications wherein it is desired that the surface of the composite 20 adjacent layer 18 be a continuous, smooth surface comprised only of a synthetic material. Residence times of from about 2 to about 15 seconds are sufficient for most laminating operations.

Figure 2:
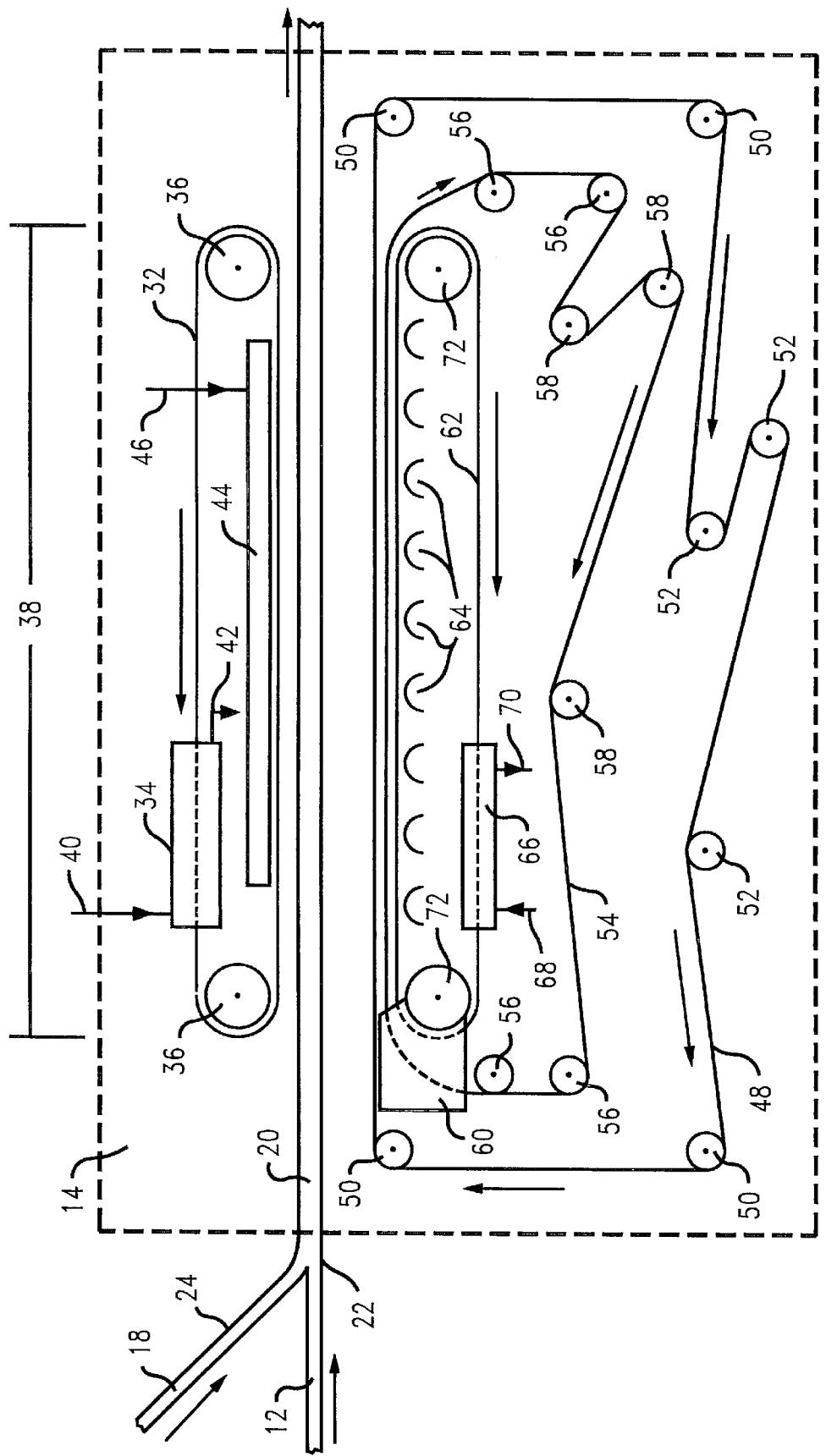
FIG. 2 is a cross-sectional view, not to scale, of the arrangement of the major components of a condebelt dryer for use in practicing the invention.

With reference now to FIG. 2, characteristic features of a condebelt-type dryer used for the extended nip dryer unit 14 and the method for laminating layer 18 to a forming fibrous web 12 in the dryer are illustrated in greater detail.

In the dryer unit 14 of the illustrated embodiment, an elongate continuous metal band 32 is heated by means of heater 34. The band 32 is moved through the heater 34 by rollers 36 so that the band is continuously heated throughout its length in an extended nip section 38. It is a feature of the invention that the composite 20 is conducted through extended nip section 38 of dryer unit 14 in a substantially flattened-out or planar configuration over a relatively extended time while bonding is effected through application of heat and pressure. Heated portions of the band 32 come into contact the outer surface 24 of composite 20 thereby heating and pressing the composite as the same is carried through the section 38 of dryer 14.

In order to reduce adhesion of the heat-softenable material to the metal band 32, it is preferred that the metal band be coated with a non-stick or release flourine or silicone containing materials. The non-stick coating may be applied to the surface of the hot platen prior to use by spraying the compound onto the surface and curing the sprayed on material about 205° C. for about 30 minutes. While the non-stick or release coating may last for several weeks of use, it may be desirable to reapply the coating about every 2 weeks to assure continued non-stick or release properties.

The heater 34 may be an electric heater, a gas fired heater, a steam heater or a hot water heater. When steam or hot water is used, the steam or hot water enters heater 34 through conduit 40 and exits through conduit 42. For some applications, a booster heater 44 may be used in addition to or in place of heater 34 for heating band 32. Like heater 34, booster heater 44 may be electric or gas-fired or it may use steam or hot water to further heat the metal band 32. Steam or hot water may be provided to booster heater 44 via conduit 46.

One of the surfaces 22 or 24 of the composite 20 is contacted in the dryer unit 14 with an elongate continuous foraminous metal band 48. The metal band 48 may be a fine wire screen or any suitable flexible foraminous material which can contact the surface of the adjacent material without adversely affecting the smoothness or surface qualities of the web. The metal band 48 moves with composite 20 through extended nip 38 and together with band 32 advances composite 20 through the elongate planar interface area of nip 38 of dryer unit 14 between bands 32 and 48. Rollers 50 guide the metal band 48 through the dryer 14 and rollers 52 provide tension on the band so that a substantially flat surface is provided for supporting the composite 20 in the dryer.

A coarser continuous metal foraminous band 54 is provided for additional support of the metal band 48. The courser metal band 54 is also moved through the dryer unit 14 by means of rollers 56 and tensioning rollers 58 in the same direction as metal band 48 and composite 20. The materials of the coarser metal band 54 may be the same as or different from the materials used for metal band 48. Other materials, such as a continuous felt cloth band may be used in place of the foraminous metal bands to support the material and provide a means for enhancing the removal of moisture from the wet fibrous web 12.

During the drying and bonding step, water removal from the composite 20 may be enhanced by applying a subatmospheric pressure to the surface of metal band 48 opposite the material contact surface, metal band 54 or to both metal bands by means of vacuum pump 60. As composite 20 moves through the dryer unit 14, water therefore may be urged from the material through the foraminous bands 48 and/or 54 by means of the vacuum pump 60 by suction and evaporation.

A further continuous metal band 62 provides support for the metal bands 48 and 54 as the composite 20 is pressed between metal band 32 and band 48 to effect bonding and drying. Because pressure is being applied to the composite 20 in the elongate planar nip section 38 during the bonding and drying step, band supports 64 are preferably provided so that the pressure is maintained substantially constant throughout the length of the extended nip section 38.

Metal band 62 may also be cooled with a cooling fluid in band cooling device 66. A cooling fluid such as chilled water enters cooling device 66 through conduit 68 and exits through conduit 70. Rollers 72 move band 62 through the cooling device 66 and in contact with metal band 54 so that band 62 cools band 54 which is in contact with and thereby cools band 48.

As described above and illustrated in the drawings, a thermal gradient is established through the composite 20 due to the use of heating band 32 and cooler foraminous band 48 which contact the opposed surfaces 22 and 24 of the composite 20. The heating and cooling bands 32 and 48 are wide enough to contact essentially the entire width of the composite 20 and move at essentially the same rate as the composite 20 through the nip section 38 of dryer unit 14.

The thermal gradient through the composite 20 in conjunction with pressure exerted on the composite by bands 32 and 48 and optional water removal using a vacuum device 60 provides rapid moisture removal from web 12 and enhanced bonding between layer 18 and web 12.

It will be appreciated that the method of the invention is especially useful for making thermoplastic coated cellulose fibrous webs. Thermoplastic materials used as layer 18 combine with the fibers of web 12 as a result of melt flow of the thermoplastic material due to the heat and pressure used in the dryer unit 14.

However, the composites of the invention may also be made with thermosetting materials or B-stageable resins which crosslink under post treatment conditions of time and temperature. The thermosetting or B-stageable materials may be incorporated in the web at the wet end or sprayed on the web before the extended nip dryer and then bond with material in layer 18 in dryer unit 14.

It is a further feature of the invention that steam evolved from the wet web 12 has a plasticizing effect on the material of layer 18 bringing about a rapid softening of the same and an intermingling of fiber ends with the softened material. Transformation of the fibers during drying of the web with the layers in a substantially planar configuration with fibers embedded in the thermoplastic material brings about an improved and more tenacious bonded interface between the layers. Accordingly, a composite web made according to the invention exhibits increased resistance to delamination.

Figure 3:
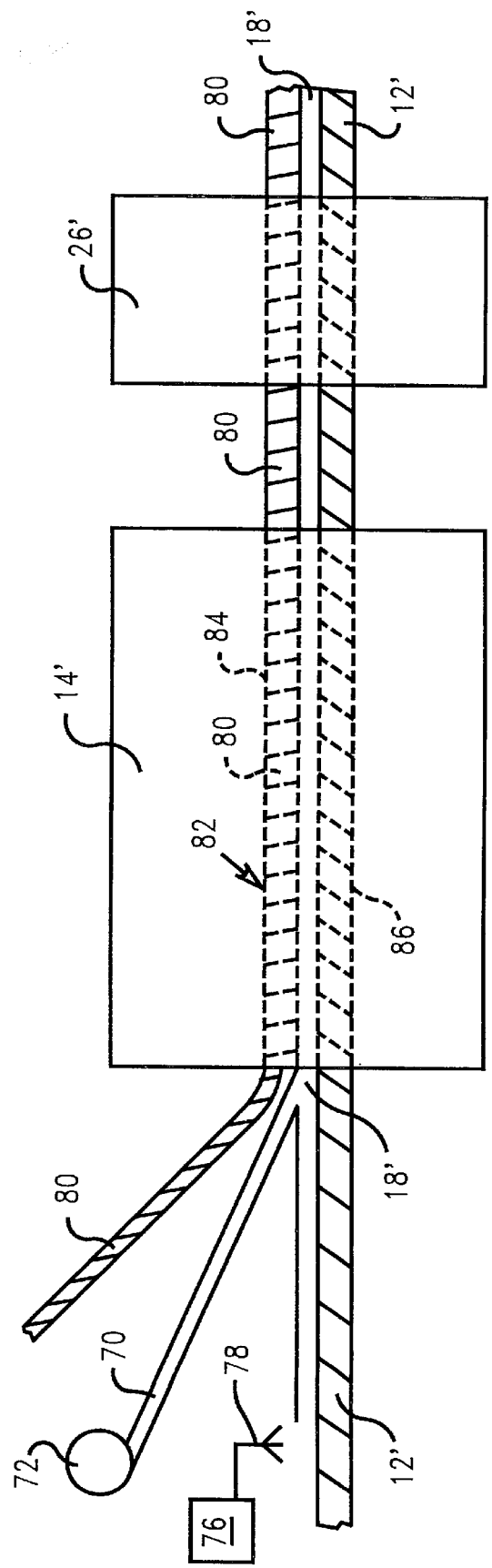
FIG. 3 is a schematic representation of a lamination process conducted according to the invention for preparing a composite containing three or more layers.

With reference now to FIG. 3, aspects of a process according to the invention for preparing a composite web containing three or more layers is illustrated. Elements of the process and components of the composite corresponding with the elements and components described with reference to FIG. 1 will be indicated with a prime suffix.

As previously described, layer 18' can be provided from a preformed sheet 70 from supply roll 72 of a heat-softenable material. Sheet 70 may comprise a continuous thermoplastic or thermosetting polymeric film or it may be a fibrous web impregnated with a heat-softenable polymeric material such as a latex.

Layer 18' may also be provided by depositing a spray containing a heat softenable polymeric material from supply 76 onto fibrous web 12'. For example, material from supply 76 can be sprayed onto web 12' using spray nozzle 78 so that the material is deposited across the width thereof in a uniform thickness to provide layer 18'. Various other means may be used to deposit material onto web 12' to provide layer 18' including, by not limited to, depositing the material from an extruder, roll coater, Myer rod and the like. Accordingly, the material for layer 18' may be provided as a dry powder or as a slurry, emulsion, solution, film, extrusion or sheet.

In whatever manner the material for layer 18' is supplied, it is continuously combined with the fibrous web 12' so that the layer 18' is in substantially continuous interfacial contact with the web 12' as the web is conducted through extended nip section 38 of dryer unit 14. It is preferred that the web 12' have a moisture content ranging from about 40% by weight to about 70% by weight as the web is moving from the web forming step to the drying step. The amount of material applied to web 12' to provide layer 18' may vary within wide limits provided the amount is sufficient to provide bonding between web 12' and a second fibrous web 80 made out of natural or synthetic fibers which is combined with layer 18'. An amount of heat-softenable material sufficient to provide a layer having of thickness ranging from about 5/1000 to about 0.1 in. is preferred.

Second fibrous web 80 may be made of any material or combination of materials which comprise web 12', may contain other or further components and may have the same or different physical characteristics such as a basis weight, caliper, stiffness, smoothness and the like. Accordingly, second fibrous web 80 may be made from a variety of natural or synthetic fibrous materials which may be woven or non-woven. Examples of suitable materials for the second web include spunbond and melt blown polyolefinic fibrous webs as well as cellulosic webs and webs made from synthetic pulp such as described in U.S. Pat. No. 5,616,384 to Goettmann et al., the disclosure of which is incorporated herein by reference as if fully set forth. Web 80 may have a moisture content ranging from 0 to about 80% by weight and a basis weight of from about 50 grams/m$^2$ to about 250 grams/m$^2$ or thickness ranging from about 2/1000 to about 25/1000 in.

Second fibrous web 80 may be continuously combined in interfacial contact with the layer 18' and web 12' in various ways to provide an at least three-layer composite 82 having oppositely facing outer surfaces 84 and 86. Most preferably, layer 18' is combined in interfacial contact with web 12' as by depositing layer 18' thereon after web 12' emerges from the wet press section of a papermaking machine with a moisture content of at least about 40% by weight water. Second web 80 is then laid down onto layer 18' to provide the at least three-layer composite 82. Alternately, second web 80 may be laid onto layer 18' simultaneously with deposition of layer 18' onto web 12' or layer 18' can first be laid onto second web 80 or vise versa, and these two layers laid onto web 12', or vice versa. Furthermore, layer 18', web 12' and second web 80 may all be brought together simultaneously in continuous interfacial contact.

As described previously for the embodiment of FIGS. 1 and 2, three-layer composite 82 is conducted through the extended nip dryer unit 14 where heat is applied to at least one of the surfaces 84 or 86 of the composite 82 using a heat-conducting surface having a temperature ranging from about 120° to about 200° C. Typically, heat will be applied to composite 82 adjacent surface 84. However, the invention is not limited to applying heat to the surface 84 of composite 82 and heat may also or only be applied to the other surface 86 of the composite 82.

Essentially simultaneously with heating the composite 82, pressure is applied to both surfaces 84 and 86 generally through the length of extended nip section 38 to dry the webs 12' and 80 and effect bonding between layer 18' and fibers of webs 12' and 80. Pressures in the range of from about 28 psig (1.93 bars) to about 150 psig (10.34 bars) are preferred for most applications. Because of the wide range of potential applications of the invention, some adjustment may be necessary to arrive at the optimal time, temperature and pressure relationship for a given composite.

A vacuum condition may also be established in or adjacent dryer unit 14 to promote removal of water from the composite 82 during the lamination, but it is preferred that the major driving force for evaporation be heat so that steam will be generated for its plasticizing effect on layer 18'. Preferably, the water evolved from composite 82 in dryer unit 14 reduces the moisture content of the webs 12' and 80 to substantially below about 40% by weight water. A subsequent conventional dryer 26' may be used to further dry the composite 82 to a moisture content of webs 12' and 80 to less than about 1% by weight water, and the composite 82 may thereafter be calendered and/or coated for a range of finishes and surface effects.

The residence time of composite 82 in the extended nip dryer 14 needed to effect bonding is determined in large part by the nature of the material comprising layer 18' and the amount of water which needs to be removed from webs 12' and 80 to complete consolidation of fibers therein and to soften materials in layer 18'. In general, the longer the residence time, the greater the degree of bonding between the materials. However, too high a temperature or too long a residence time could damage the materials and/or cause too much of the layer 18' to flow into the webs 12' and 80 for many applications wherein it is desired that layer 18' be maintained as a continuous and discrete layer, which may be important in maintaining an adequate bond between webs 12' and 80. Because of the addition of web 80 which may be wetted, a somewhat longer residence time of composite 82 in nip section 38 of dryer unit 14 may be required as compared with the embodiment of FIG. 1.

While a three layer composite is illustrated and described with reference to FIG. 3, it is understood that additional heat-softenable layers and additional fibrous webs may be combined to provide multi-layer composites according to the invention.

Having described and illustrated various aspects and embodiments of the invention, it will be appreciated that many modifications, rearrangements, additions, improvements and substitutions may be made to these embodiments by those of ordinary skill all of which are nevertheless within the spirit and scope of the invention as defined in the appended claims.

What is claimed is:

1. A method for laminating a synthetic film or sheet to a fibrous web which comprises continuously depositing an aqueous slurry of fibers on a moving foraminous support leaving fibers deposited thereon as a continuous fibrous web, continuously pressing the web to consolidate the fibers to provide a pressed fibrous web having a moisture content of at least about 40% by weight water, continuously combining the pressed fibrous web with a continuous layer containing a thermoplastic or thermoset material in interfacial contact with fibers of the fibrous web to provide an at least two-layer continuous composite having opposed outer surfaces and continuously conducting the composite through an extended nip dryer while applying pressure substantially simultaneously to the opposed outer surfaces of the composite and applying heat to at least one of the surfaces to cause evaporation of water from the fibrous web reducing the moisture content thereof to below about 40% by weight water and plasticizing the thermoplastic or thermoset material so that at least a mechanical bond is achieved between the layer and the fibrous web characterized by an intermingling of fibers of the fibrous web with the thermoplastic or thermoset material in the layer.

2. The method of claim 1 wherein the composite is heated at a temperature ranging from about 110° to about 250° C.

3. The method of claim 1 wherein the pressure applied to the composite ranges from about 25 to about 150 psig.

4. The method of claim 1 wherein the pressed web has a moisture content ranging from about 40 to about 70% by weight water at the time the layer is deposited thereon.

5. The method of claim 1 wherein the layer is a continuous film comprising a thermoplastic material.

6. The method of claim 1 wherein the layer is selected from the group consisting of woven, non-woven and spunbond materials made from thermoplastic fibers or a mixture of natural fibers and thermoplastic fibers.

7. The method of claim 6 wherein the layer is a continuous film comprising thermoplastic fibers.

8. The method of claim 1 wherein the layer comprises a cellulosic fibrous web containing a from about 0.01 to about 20% by weight thermoplastic or thermoset resin.

9. The method of claim 1 wherein pressure and heat are applied to the composite for from about 2 to about 15 seconds.

10. The method of claim 1 wherein the moisture content of the composite is reduced to below about 5% by weight.

11. The method of claim 1 further comprising combining a second fibrous web with the two-layer composite in interfacial contact with the layer to provide an at least three-layer composite having opposed outer surfaces and thereafter applying pressure and heat to the opposed outer surfaces thereof to cause evaporation of water from the fibrous web reducing the moisture content thereof to below about 40% by weight water and plasticizing the thermoplastic or thermoset material in the layer so that at least a mechanical bond is achieved between the layer and the webs characterized by an intermingling of fibers of the webs with the thermoplastic or thermoset material in the layer.

12. The method of claim 1 wherein the pressed fibrous web and layer are combined by depositing the layer onto the web.

13. A product made by the process of claim 1.

14. An on-line lamination process for making a laminated fibrous web composite which comprises continuously conducting a continuous fibrous web having a moisture content ranging from about 40 to about 70% by weight water and a layer comprising a heat-softenable polymeric material in interfacial contact therewith through an extended nip dryer to provide a continuous at least two-layer composite having opposed outer surfaces and applying pressure substantially simultaneously to the opposed outer surfaces of the composite in the dryer and heating at least one of the surfaces of the composite to cause evaporation of water therefrom sufficient to substantially reduce the water content of the web and to cause the polymeric material to plasticize and soften so that fibers from the web become intermingled with the polymeric material forming a bond therebetween.

15. The process of claim 14 wherein composite is heated at a temperature ranging from about 110° to about 250° C.

16. The process of claim 14 wherein the pressure applied to the composite ranges from about 25 to about 150 psig.

17. The process of claim 14 wherein the layer comprises a thermoplastic polymeric film.

18. The process of claim 14 wherein the layer is selected from a woven, non-woven or spunbond web containing heat-softenable synthetic fibers or a mixture of natural and heat-softenable synthetic fibers.

19. The process of claim 18 wherein the layer comprises thermoplastic fibers.

20. The process of claim 14 further comprising drying the composite to a moisture content of less than about 5% by weight water.

21. The process of claim 14 wherein the layer comprises a cellulosic fibrous web containing a from about 0.01 to about 20% by weight thermoplastic or thermoset resin.

22. The process of claim 14 wherein pressure and heat are applied to the fibrous web composite for from about 2 to about 15 seconds.

23. The process of claim 14 further comprising forming the fibrous web on a fourdrinier wire by depositing an aqueous slurry of fibers thereon from a headbox and removing water from the fibers to produce the fibrous web and then pressing the web to reduce the moisture content thereof to at least about 40% by weight water.

24. The process of claim 14 wherein the layer is supplied in interfacial contact with the fibrous web by spraying the polymeric material onto the fibrous web.

25. The process of claim 14 further comprising combining a second fibrous web with the two-layer composite in interfacial contact with the layer comprising a heat-softenable polymeric material to provide an at least three-layer composite having opposed outer surfaces and thereafter applying pressure and heat to the opposed outer surfaces thereof to cause evaporation of water from the fibrous web reducing the moisture content thereof to below about 40% by weight water and plasticizing the heat-softenable polymeric material so that at least a mechanical bond is achieved between the layer and the webs characterized by an intermingling of fibers in the webs with the heat-softenable polymeric material in the layer.

26. The process of claim 14 wherein the fibrous web and layer are combined by depositing the layer onto the web.

27. A laminated fibrous web composite made by the process of claim 14.

28. A method for making a laminar composite containing a continuous thermoplastic or thermoset polymer layer and a continuous cellulosic fibrous web having a moisture content below about 40% by weight water which comprises continuously increasing the moisture content of the web to from about 40 to about 70% by weight water, combining the web with a layer of material containing a thermoplastic or thermoset polymer in interfacial contact with fibers of the cellulosic web to form a composite web, continuously conducting the composite web through an extended nip dryer and bonding the layer to fibers of the cellulosic web by applying heat and pressure to the composite in the extended nip dryer.

29. The method of claim 28 wherein layer is heated in the dryer at a temperature ranging from about 110° to about 250° C.

30. The method of claim 28 wherein the composite is pressed in the dryer at a pressure ranging from about 25 to about 150 psig.

31. The method of claim 28 wherein the layer comprises a thermoplastic material.

32. The method of claim 28 wherein the layer comprises a web containing a woven, non-woven or spunbond material made from synthetic fibers or a mixture of natural and synthetic fibers.

33. The method of claim 32 wherein the web comprises thermoplastic fibers.

34. The method of claim 28 wherein the layer comprises a cellulosic web containing a from about 0.01 to about 20% by weight thermoplastic or thermoset resin.

35. The method of claim 28 further comprising applying a subatmospheric pressure to the composite during the bonding step.

36. The method of claim 28 further comprising drying the composite to a moisture content of less than about 5% by weight water.

37. The method of claim 28 wherein heat and pressure are applied to the composite web for from about 2 to about 15 seconds.

38. The method of claim 28 wherein the fibrous web and layer are combined by depositing the layer onto the web.

39. The method of claim 38 wherein the layer is deposited on the web by spraying the material onto the web.

40. The method of claim 28 further comprising combining a second fibrous web with the two-layer composite in interfacial contact with the layer of thermoplastic or thermoset polymer to provide an at least three-layer composite having opposed outer surfaces and thereafter applying pressure and heat to the opposed outer surfaces to cause evaporation of water from the fibrous web reducing the moisture content thereof to below about 40% by weight water and plasticizing the polymer so that at least a mechanical bond is achieved between the layer and the webs characterized by an intermingling of fibers in the webs with the polymeric layer.

41. A composite made by the process of claim 28.

42. A process for making a three or more-layer composite which comprises continuously combining an elongate bonding layer containing a heat-softenable material as a powder, spray, film or sheet with an elongate first fibrous web and an elongate second fibrous web with the layer sandwiched between the first and second webs in interfacial contact therewith to provide an at least three-layer composite and applying heat and pressure to the composite in an extended nip dryer unit sufficient to cause fibers of the first and second webs to intermingle with the bonding layer, wherein the first and second fibrous webs comprise natural or synthetic fibers and at least one of the first or second webs has a moisture content of from about 40% to about 70% by weight.

43. The method of claim 42 wherein the composite is heated in the dryer at a temperature ranging from about 110° to about 250° C.

44. The method of claim 43 wherein the composite is pressed in the dryer unit at a pressure of from about 25 to about 150 psig.

45. The method of claim 44 wherein the bonding layer comprises a thermoplastic material.

46. The method of claim 42 further comprising applying a subatmospheric pressure to the composite in the dryer.

47. The method of claim 42 further comprising drying the composite to a moisture content of less than about 5% by weight water.

48. The method of claim 42 wherein heat and pressure are applied to the composite in the dryer for from about 2 to about 15 seconds.

49. The method of claim 42 wherein the second web comprises a cellulosic web containing a from about 0.01 to about 20% by weight thermoplastic or thermoset resin.

50. The method of claim 42 wherein the fibrous webs and bonding layer are combined by depositing the bonding layer onto the first fibrous web.

51. A composite made by the process of claim 42.

* * * * *

UNITED STATES PATENT AND TRADEMARK OFFICE
CERTIFICATE OF CORRECTION

PATENT NO. : 6,221,798 B1  
DATED : April 24, 2001  
INVENTOR(S) : Anant D. Mahale et al.

It is certified that error appears in the above-identified patent and that said Letters Patent is hereby corrected as shown below:

Column 7,
Line 48, after "including," delete "by not limited to" and insert therefore -- but not limited to --.

Signed and Sealed this

Eighth Day of January, 2002

Attest:

JAMES E. ROGAN  
Attesting Officer     Director of the United States Patent and Trademark Office